(12) United States Patent
Bremkens et al.

(10) Patent No.: US 11,807,322 B2
(45) Date of Patent: Nov. 7, 2023

(54) VEHICLE STEERING SYSTEM

(71) Applicant: Ford Global Technologies, LLC, Dearborn, MI (US)

(72) Inventors: Jan Bremkens, Straelen/NRW (DE); Daniel F. Slavin, Northville, MI (US); Simon Nolden, Köln/NRW (DE); Tomas Mawyin, Livonia, MI (US); Alex Gidley, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 165 days.

(21) Appl. No.: 17/373,327

(22) Filed: Jul. 12, 2021

(65) Prior Publication Data

US 2022/0017142 A1 Jan. 20, 2022

(30) Foreign Application Priority Data

Jul. 14, 2020 (DE) .......................... 102020118485.9

(51) Int. Cl.
*B62D 6/00* (2006.01)
*B62D 5/04* (2006.01)
*B62D 15/02* (2006.01)

(52) U.S. Cl.
CPC ........... *B62D 6/005* (2013.01); *B62D 5/0481* (2013.01); *B62D 6/008* (2013.01); *B62D 15/025* (2013.01)

(58) Field of Classification Search
CPC .................................................. G06V 20/588
See application file for complete search history.

(56) References Cited

U.S. PATENT DOCUMENTS

| 9,221,494 | B2 | 12/2015 | Hestermeyer et al. |
| 9,545,946 | B2 | 1/2017 | Hestermeyer et al. |
| 2006/0175113 | A1* | 8/2006 | Rodeghiero ....... B60K 23/0808 180/249 |

(Continued)

FOREIGN PATENT DOCUMENTS

| DE | 102014204461 A1 | 11/2014 |
| DE | 102013220947 B4 | 9/2017 |

*Primary Examiner* — Jeff A Burke
*Assistant Examiner* — Jerrod Irvin Davis
(74) *Attorney, Agent, or Firm* — Frank A. MacKenzie; Bejin Bieneman PLC

(57) ABSTRACT

A present steering position of a manually actuatable steering unit of the motor vehicle is determined based on sensor data. A steering command is generated based on the present steering position of the steering unit. Then, based on sensor-detected present vehicle dynamics data, it is determined whether the motor vehicle is in a straight-ahead running situation during driving operation. It is determined whether, during the straight-ahead running situation of the motor vehicle, the present steering position of the steering unit deviates from a straight-ahead running position of the steering unit for at least one of a specified time period and a specified traveling distance of the motor vehicle. A compensation steering command is generated based on the determined deviation of the present steering position of the steering unit from the straight-ahead running position. A corrected steering command is generated based on combining the compensation steering command with the steering command.

9 Claims, 1 Drawing Sheet

(56) References Cited

U.S. PATENT DOCUMENTS

2015/0051794 A1* 2/2015 Wei .................... B62D 15/021
 701/41
2017/0096163 A1* 4/2017 Sakaguchi ............... B62D 6/04
2018/0319422 A1* 11/2018 Polmans ................ B62D 5/005

* cited by examiner

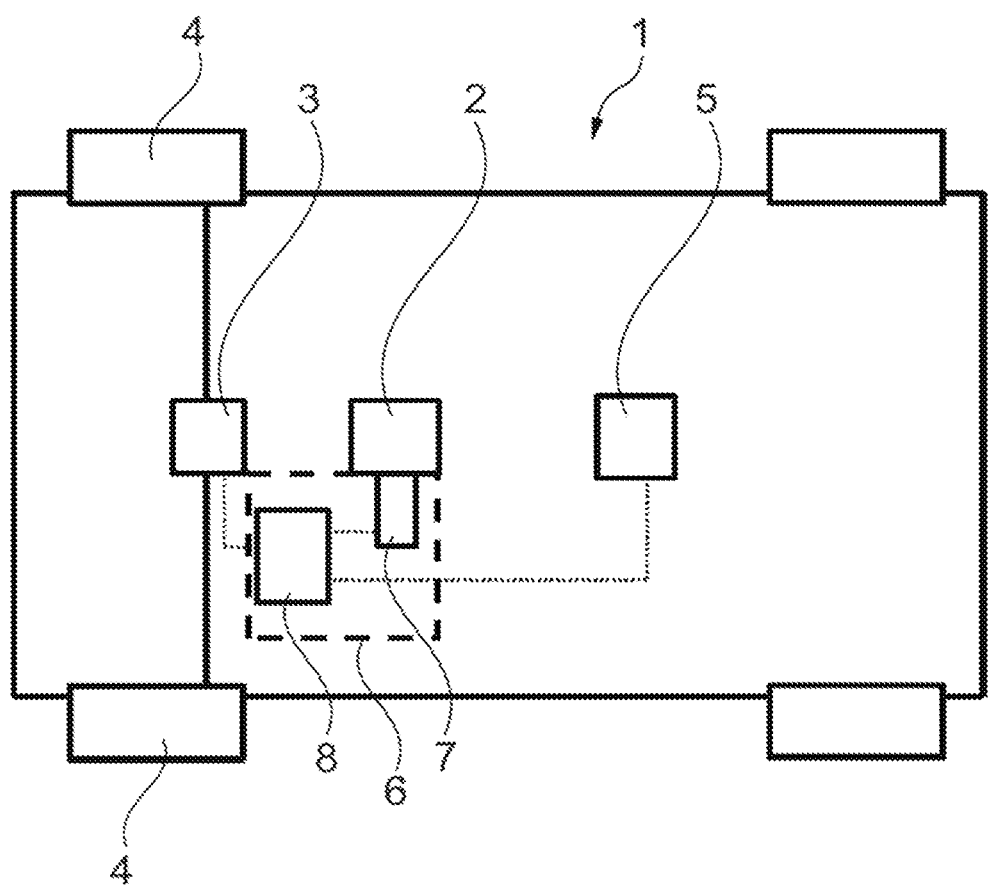

VEHICLE STEERING SYSTEM

CROSS-REFERENCE TO RELATED APPLICATION

This patent application claims priority to German Application No. DE 102020118485.9 filed on Jul. 14, 2020, which is hereby incorporated by reference in its entirety.

BACKGROUND

Autonomously driving motor vehicles may, in some cases, depending on the application, be implemented without a steering wheel. Such motor vehicles without a steering wheel require a steer-by-wire safety steering system in order to allow steering of a motor vehicle in an emergency situation if such steering is not possible in autonomous driving operation, for example, due to a fault.

In a steer-by-wire steering system, a present steering angle of the steering wheel of the motor vehicle is detected and, using a steering algorithm, a steering angle of a steering pinion of a steering device for steering wheels of the motor vehicle is determined based on the respective present steering angle of the steering wheel, and a steering angle associated with the steering angle of the steering pinion is generated, which is output via a CAN bus system of the motor vehicle to the steering device of the motor vehicle. The steering device commonly operates in a position control operating mode and follows the steering command of the steer-by-wire steering system.

If a toe angle of the motor vehicle is misaligned, or a position sensor of the steering device of the motor vehicle, or an electronics unit of the steer-by-wire steering system is not correctly calibrated, the motor vehicle no longer travels straight ahead when the steering wheel is situated in the straight-ahead running position. Instead, the motor vehicle drifts laterally out of a traveling lane, which is not desired.

In order to prevent such lateral drift of the motor vehicle, the driver must hold the steering wheel in a steering position which deviates from the straight-ahead running position. If the steering wheel is acted on with a resetting force in the direction of the straight-ahead running position, the driver must permanently exert a pulling force or a pulling action (steering pull) on the steering wheel which opposes the resetting force.

It is known for the steering pull and the lateral drift to be automatically compensated by means of Pull Drift Compensation (PDC) in a motor vehicle with a servo steering system, wherein the servo steering system is configured as an EPAS (Electric Power Assisted Steering) servo steering system, in the case of which a program-controlled electric actuating motor on a component of the steering device, for example, a steering column or a steering gear, assists and superposes steering movements of a driver. Here, steering pull is to be understood to mean a noticeable effort in holding the steering wheel that is necessary in order to travel straight-ahead.

DE 10 2013 220 947 B4 and U.S. Pat. No. 9,545,946 B2 each disclose a steering system for assisting straight-ahead running of a vehicle. The system, which has been proven in practice, has an active steering assistance means and an assistance function which is configured to calculate a required assistance moment based on a steering torque applied to the steering wheel. Furthermore, the system has a correction means which is configured to calculate a correction torque based on a progressively calculated assistance torque, wherein the steering assistance means is controllable by means of a control torque which is made up of a superposition of the assistance torque with the correction torque.

DE 10 2014 204 461 B4 and U.S. Pat. No. 9,221,494 B2 each disclose a method for improving the straight-ahead running of a vehicle with a steering system which has a PDC system and an active steering assistance means. The method, which has been proven in practice, comprises the steps: detecting data relating to the driving dynamics; identifying, by means of the PDC system, a state of straight-ahead running from the detected data relating to the driving dynamics, wherein at least one value of the detected data relating to the driving dynamics, or a value derived from said data relating to the driving dynamics, lies below or above a threshold value for a specified time period or a specified distance; measuring a torque acting at the steering system at least during straight-ahead running of the vehicle; calculating a final compensation torque; controlling the active steering assistance means with the final compensation torque for counter-compensation of the measured torque acting on the steering system; providing a torque value on the basis of a detected lateral acceleration of the vehicle; calculating a torque component from the measured torque minus the provided torque value; calculating, by means of the PDC system, a provisional compensation torque on the basis of the detected data relating to the driving dynamics and the previously calculated torque component; calculating the final compensation torque from the sum of the provisional compensation torque calculated by means of the PDC system and the provided torque value.

SUMMARY

The present disclosure relates to a steer-by-wire steering system for a motor vehicle, having at least one sensor unit for detecting a present steering position of a manually actuatable steering unit of the motor vehicle, at least one electronics unit which is connected to the sensor unit and which is configured to generate a steering command based on the respective present steering position of the steering unit. The present disclosure furthermore relates to a motor vehicle, in particular motor car, having at least one manually actuatable steering unit, at least one steering actuator for steering at least one steerable vehicle wheel based on a steering command, and at least one sensor arrangement for detecting present vehicle dynamics data. The present disclosure furthermore relates to a method for assisting straight-ahead running of a traveling motor vehicle which has a steer-by-wire steering system, wherein a present steering position of a manually actuatable steering unit of the motor vehicle is detected, and a steering command is generated based on the respective present steering position of the steering unit.

The disclosure discloses techniques for implementing drift compensation, in particular pull drift compensation, in a steer-by-wire steering system of a motor vehicle, in particular of an autonomous motor vehicle.

According to an embodiment of the present disclosure, there is provided a steer-by-wire steering system having the electronics unit, which is configured to determine, based on sensor-detected present vehicle dynamics data, whether the motor vehicle is in a straight-ahead running situation during driving operation, to determine whether, during the straight-ahead running situation of the motor vehicle, the present steering position of the steering unit deviates from a straight-ahead running position over a specified time period and/or over a specified traveling distance, to generate a compensation steering command based on a deviation of the present steering position of the steering unit from the straight-ahead running position, and to combine the compensation steering command with the steering command to generate a corrected steering command, if, during the straight-ahead running situation of the motor vehicle, the present steering position of the steering unit deviates from the straight-ahead running position over the specified time period and/or over the specified traveling distance.

It should be pointed out that the features and measures specified individually in the following description may be combined with one another in any desired technically meaningful way and disclose further configurations of the disclosure. The description, in particular in conjunction with the figure, characterizes and specifies the disclosure further.

The steer-by-wire steering system according to the disclosure can, in the event of a fault based, for example, on a toe angle misalignment of the motor vehicle, or a fault of a position sensor of a steering device of the motor vehicle, or insufficient or incorrect calibration of the electronics unit of the steer-by-wire steering system, be automatically calibrated in order to be able to ensure straight-ahead running of the traveling motor vehicle without the need for a driver of the motor vehicle to permanently hold the steering unit in a steering position that deviates from the straight-ahead running position.

This calibration of the steer-by-wire steering system is implemented by generating the corrected steering command instead of the original steering command, and outputting the corrected steering command to the steering device of the motor vehicle. The compensation steering command generated for generating the corrected steering command contains information relating to the extent of the deviation of the steering position of the steering unit before the calibration from the straight-ahead running position, such that the corrected steering command is generated individually with respect to the deviation. After the calibration of the steer-by-wire steering system, the steering unit is situated in the straight-ahead running position during straight-ahead travel of the motor vehicle.

The electronics unit performs the stated calibration only if, during the straight-ahead running of the motor vehicle, the present steering position of the steering unit deviates from the straight-ahead running position over the specified time period and/or over the specified traveling distance. In this way, the calibration is made insensitive with respect to brief steering movements of the steering unit during the straight-ahead travel of the motor vehicle.

The steering command, the compensation steering command, and the corrected steering command are electrical commands or signals that are generated by the electronics unit, wherein the steering command or the corrected steering command can be output to the steering device of the motor vehicle. To generate these commands, the electronics unit executes various programs or algorithms.

The electronics unit is preferably configured to determine continuously while the motor vehicle is driving, and in particular also after a steering command correction, whether the motor vehicle is presently in a straight-ahead running situation, to determine whether, during the present straight-ahead running situation of the motor vehicle, the present steering position of the steering unit deviates from the straight-ahead running position over a specified time period and/or over a specified traveling distance, to generate a respectively individual compensation steering command based on the deviation of the present steering position of the steering unit from the straight-ahead running position, and to combine the compensation steering command with the present steering command to generate an individual corrected steering command, if, during the present straight-ahead running situation of the motor vehicle, the present steering position of the steering unit deviates from the straight-ahead running position over the specified time period and/or over the specified traveling distance.

In one advantageous embodiment, the steer-by-wire steering system has at least one resetting unit by means of which, in the case of a present steering position that deviates from the straight-ahead running position, the steering unit can be acted on with a resetting force in the direction of the straight-ahead running position. In this way, the steering unit can be moved under the action of the resetting force from the present steering position, which deviates from the straight-ahead running position, into the straight-ahead running position when a person releases their grip on the steering unit. Precisely in the case of a steer-by-wire steering system configured in this way, the calibration according to the disclosure is advantageous because, after the calibration, a driver of the motor vehicle no longer has to exert a pulling force, which is opposed to the resetting force, on the steering unit.

A further advantageous embodiment provides that the resetting unit has at least one resetting spring or an actively controllable resetting device. This constitutes a structurally simple embodiment of the resetting unit. The actively controllable resetting device may, for example, have a servo motor.

According to a further advantageous embodiment, the electronics unit is configured to determine, from a present yaw rate of the motor vehicle, a present traveling speed of the motor vehicle, and/or a present lateral acceleration of the motor vehicle, whether the motor vehicle is in the straight-ahead running situation during driving operation. These vehicle dynamics data are commonly already detected by a vehicle sensor arrangement and can thus be monitored by means of the electronics unit during the driving operation of the motor vehicle, so that the electronics unit can identify whether or not the motor vehicle is in the straight-ahead running situation during driving operation.

A motor vehicle has a steer-by-wire steering system according to any of the above-stated embodiments or a combination of at least two of these embodiments with one another.

The advantages mentioned above with regard to the steer-by-wire steering system are correspondingly associated with the motor vehicle. The motor vehicle may be a motor car, in particular, a passenger motor car. The steering actuator of the motor vehicle may have at least one electric motor, which is actuatable based on the steering command or corrected steering command.

In one advantageous embodiment, the steering unit has at least one steering means, at least one steering wheel, at least one rotary dial or at least one steering lever. The steering lever may, for example, be configured as a joystick or gamepad.

A further advantageous embodiment provides that the motor vehicle is configured to perform autonomous driving operation. Here, the steer-by-wire steering system may be used as a safety steering system that is activated or actuated when the autonomous driving operation of the motor vehicle has a fault. If the autonomous driving operation has a fault with regard to the steering of the motor vehicle, manual emergency steering operation can be performed by means of the steer-by-wire steering system, and the autonomous driving operation can be deactivated.

A method includes, based on sensor-detected present vehicle dynamics data, determining whether the motor vehicle is in a straight-ahead running situation during driving operation, determining whether, during the straight-ahead running situation of the motor vehicle, the present steering position of the steering unit deviates from a straight-ahead running position over a specified time period and/or over a specified traveling distance, generating a compensation steering command based on a deviation of the present steering position of the steering unit from the straight-ahead running position, combining the compensation steering command with the steering command to generate a corrected steering command, if, during the straight-ahead running situation of the motor vehicle, the present steering position of the steering unit deviates from the straight-ahead running position over the specified time period and/or over the specified traveling distance.

The advantages mentioned above with regard to the steer-by-wire steering system are correspondingly associated with the method. In particular, the steer-by-wire steering system according to one of the abovementioned embodiments or a combination of at least two of said embodiments with one another may be used for carrying out the method.

According to one advantageous embodiment, from a present yaw rate of the motor vehicle, a present traveling speed of the motor vehicle and/or a present lateral acceleration of the motor vehicle, it is determined whether the motor vehicle is in the straight-ahead running situation during driving operation. The advantages mentioned above with regard to the corresponding embodiment of the steer-by-wire steering system are correspondingly associated with this embodiment.

Further advantageous embodiments of the disclosure are disclosed in the following description of the figure, in which:

BRIEF DESCRIPTION OF THE DRAWINGS

FIG. 1 is a schematic illustration of an exemplary embodiment of a motor vehicle.

DETAILED DESCRIPTION

FIG. 1 is a schematic illustration of an exemplary embodiment of a motor vehicle 1 in the form of a motor car, which is configured to perform autonomous driving operation.

The motor vehicle 1 has a manually actuatable steering unit 2 which has a steering means (not shown), a steering wheel (not shown), a rotary dial (not shown) or a steering lever (not shown). The motor vehicle 1 may have a resetting unit (not shown) by means of which, in the case of a present steering position of the steering unit 2 that deviates from a straight-ahead running position, the steering unit 2 can be acted on with a resetting force in the direction of the straight-ahead running position. The resetting unit may have at least one resetting spring.

Furthermore, the motor vehicle 1 has a steering actuator 3 for steering vehicle wheels 4 of the motor vehicle 1 based on a steering command.

Furthermore, the motor vehicle 1 has a sensor arrangement 5 for detecting present vehicle dynamics data.

The motor vehicle 1 furthermore has a steer-by-wire steering system 6. The steer-by-wire steering system 6 has a sensor unit 7 for detecting a present steering position of the steering unit 2, and an electronics unit 8 which is connected to the sensor unit 7 and which is configured to generate a steering command based on the respective present steering position of the steering unit 2.

The electronics unit 8 is configured to determine, based on present vehicle dynamics data detected by sensor means by the sensor arrangement 5, whether the motor vehicle 1 is in a straight-ahead running situation during driving operation. In particular, the electronics unit 8 is configured to determine, from a present yaw rate of the motor vehicle 1, a present traveling speed of the motor vehicle 1, and/or a present lateral acceleration of the motor vehicle 1, whether the motor vehicle 1 is in the straight-ahead running situation during driving operation.

Furthermore, the electronics unit 8 is configured to determine whether, during the straight-ahead running of the motor vehicle 1, the present steering position of the steering unit 2 deviates from a straight-ahead running position over a specified time period and/or over a specified traveling distance.

Furthermore, the electronics unit 8 is configured to generate a compensation steering command based on a deviation of the present steering position of the steering unit 2 from the straight-ahead running position, and to combine the compensation steering command with the steering command to form a corrected steering command, if, during the straight-ahead running situation of the motor vehicle 1, the present steering position of the steering unit 2 deviates from the straight-ahead running position over the specified time period and/or over the specified traveling distance.

LIST OF REFERENCE SIGNS

1 Motor vehicle
2 Steering unit
3 Steering actuator
4 Vehicle wheel
5 Sensor arrangement
6 Steer-by-wire steering system
7 Sensor unit
8 Electronics unit

The invention claimed is:

1. A steering system for a motor vehicle comprising:
an electronics control unit configured to:
  determine a present steering position of a manually actuatable steer-by-wire steering unit of the motor vehicle based on sensor data;
  generate a steering command based on the present steering position of the steer-by-wire steering unit;
  then, determine, based on sensor-detected present vehicle dynamics data, whether the motor vehicle is in a straight-ahead running situation during driving operation;
  upon determining the motor vehicle is in the straight-ahead running situation, determine whether the present steering position of the steer-by-wire steering unit deviates from a straight-ahead running position of the steer-by-wire steering unit for at least one of a specified time period and a specified traveling distance of the motor vehicle;
  upon determining a deviation of the present steering position of the steer-by-wire steering unit from the straight-ahead running position, generate a compensation steering command based on the deviation; and
  generate a corrected steering command by combining the compensation steering command with the steering command,
wherein a resetting unit, that includes a resetting spring or a servo motor, is configured to, upon determining the present steering position deviates from the straight-ahead running position, act on the steer-by-wire steering unit with a resetting force in a direction of the straight-ahead running position.

2. The steering system of claim 1, wherein the electronics control unit is further configured to provide one of the steering command or the corrected steering command to a steering actuator configured to steer a wheel of the motor vehicle.

3. The system of claim 1, wherein the present vehicle dynamics data includes at least one of a present yaw rate of the motor vehicle, a present traveling speed of the motor vehicle, and a present lateral acceleration of the motor vehicle.

4. A motor vehicle, comprising:
a wheel;
a manually actuatable steer-by-wire steering unit;
a resetting unit including one of a resetting spring or a servo motor;
a steering actuator configured to steer the wheel based on a steering command or a corrected steering command; and
an electronics unit in communication with the steering actuator, the electronics control unit configured to:
determine a present steering position of the steer-by-wire steering unit based on sensor data;
generate the steering command based on the present steering position of the steer-by-wire steering unit;
then, determine, based on sensor-detected present vehicle dynamics data, whether the motor vehicle is in a straight-ahead running situation during driving operation;
upon determining the motor vehicle is in the straight-ahead running situation, determine whether the present steering position of the steer-by-wire steering unit deviates from a straight-ahead running position of the steer-by-wire steering unit for at least one of a specified time period and a specified traveling distance of the motor vehicle;
upon determining a deviation of the present steering position of the steer-by-wire steering unit from the straight-ahead running position, generate a compensation steering command based on the deviation; and
generate a corrected steering command by combining the compensation steering command with the steering command,
wherein the resetting unit is configured to, upon determining the present steering position deviates from the straight-ahead running position, act on the steer-by-wire steering unit with a resetting force in a direction of the straight-ahead running position.

5. The motor vehicle of claim 4, wherein the electronics control unit is further configured to provide one of the steering command or the corrected steering command to the steering actuator.

6. The motor vehicle of claim 4, wherein the present vehicle dynamics data includes at least one of a present yaw rate of the motor vehicle, a present traveling speed of the motor vehicle, and a present lateral acceleration of the motor vehicle.

7. A method, comprising:
determining a present steering position of a manually actuatable steer-by-wire steering unit of the motor vehicle based on sensor data;
generating a steering command based on the present steering position of the steer-by-wire steering unit;
then, determining, based on sensor-detected present vehicle dynamics data, whether the motor vehicle is in a straight-ahead running situation during driving operation;
upon determining the motor vehicle is in the straight-ahead running situation, determining whether the present steering position of the steer-by-wire steering unit deviates from a straight-ahead running position of the steer-by-wire steering unit for at least one of a specified time period and a specified traveling distance of the motor vehicle;
upon determining a deviation of the present steering position of the steer-by-wire steering unit from the straight-ahead running position, generating a compensation steering command based on the deviation;
generating a corrected steering command by combining the compensation steering command with the steering command; and
via a resetting unit including one of a resetting spring or a servo motor, acting on the steer-by-wire steering unit with a resetting force in a direction of the straight-ahead running position.

8. The method of claim 7, further comprising providing one of the steering command or the corrected steering command to a steering actuator configured to steer a wheel of a motor vehicle.

9. The method of claim 7, wherein the present vehicle dynamics data includes at least one of a present yaw rate of the motor vehicle, a present traveling speed of the motor vehicle, and a present lateral acceleration of the motor vehicle.

* * * * *